Figure 1:
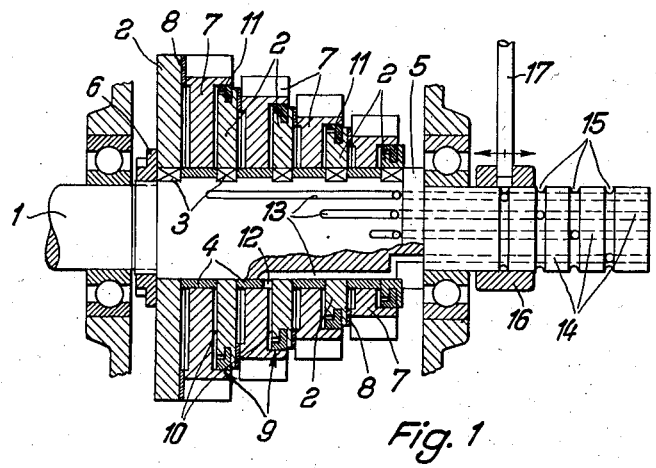

March 4, 1958 H. PAPST 2,825,234
MULTIPLE ARRANGEMENT FOR FRICTIONAL POWER TRANSMISSION
Filed Oct. 15, 1954

Inventor:
Hermann Papst
By Barnes, Kisselle, Laughlin & Raisch
Attorneys

United States Patent Office 2,825,234
Patented Mar. 4, 1958

2,825,234

MULTIPLE ARRANGEMENT FOR FRICTIONAL POWER TRANSMISSION

Hermann Papst, St. Georgen, Schwarzwald, Germany

Application October 15, 1954, Serial No. 462,523

Claims priority, application Germany June 5, 1954

6 Claims. (Cl. 74—364)

This invention relates to a multiple arrangement for frictional power transmission.

In connection with clutches, gears, and brakes it is known to arrange the power transmitting member movably, and to use compressed air or pressure fluids for bringing it into frictional engagement with its associated member from which the driving force is to be taken or to which the drive is to be transmitted.

The invention proposes to construct such an arrangement as a multiple arrangement and thus to provide, for example, change speed gears or variable clutches, or also combinations of a clutch and a gear with a brake.

It is a further object of the invention to provide multiple arrangements of the type described, which are simple in construction and efficient and reliable in operation.

According to the invention, this is achieved by arranging on a common shaft in alternate sequence fixed and movable power transmitting members, each fixed member forming a pressure system with one of the adjacent movable members while serving as a friction surface for the other movable member. It has been found convenient to provide each of the pressure systems with a sealer ring located between the cylinder member and the piston member, the arrangement being such that the ring is urged against surfaces of both members under the influence of the pressure fluid. This increases the frictional force effecting the drive of the movable member, respectively the frictional force exerted by the movable member, and correspondingly improves the efficiency of power transmission.

For the same reasons it may be convenient to arrange a sealer ring between the movable member of each pressure system and the shaft in such a manner, that the ring is urged against surfaces of the movable member and of the shaft under the influence of the pressure fluid.

The movable power transmitting members may constitute the cylinders, as well as the pistons, of the pressure systems, and the fixed power transmitting members may accordingly be the pistons or the cylinders of the pressure systems. Generally it will be recommendable, however, to construct the movable power transmitting members as cylinders and the fixed power transmitting members as pistons of the pressure systems, since such an arrangement makes it possible to let the frictional forces act on the shaft at the greatest possible distance from the central axis of the latter. The mechanical construction of the arrangement may be effected in many various ways. Suitable constructions will presently be described in more detail in connection with preferred embodiments of the invention.

The combination of a change speed gear, which may be a multiple speed gear, with a brake for retarding or stopping the gear, which is made possible by the invention, may be provided in a simple manner by making the last of the movable power transmitting members co-operate with an associated stationary surface so that it constitutes a brake together with the latter.

For use with change speed gears, the arrangement according to the invention is conveniently chosen in such a manner, that the movable power transmitting members are carried either only by the driving shaft or only by the driven shaft, so that the power transmitting members co-operating with them are fixedly arranged on the other shaft, whereby the whole construction is greatly simplified which again results in a substantial reduction of costs. Both arrangements may, however, also be combined with each other in such a manner, that only the greater one of the co-operating members of the driven shaft, resp. the driving shaft, is constructed as a movable power transmitting member.

Figure 2:
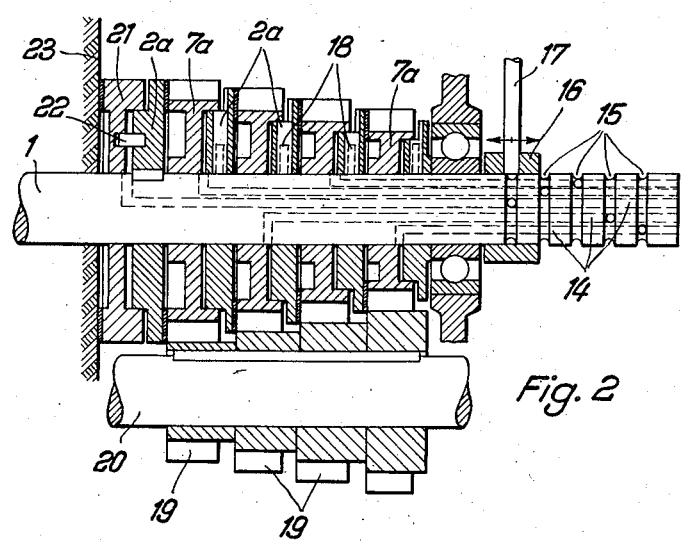

Two preferred embodiments of the invention are shown, by way of example only, in the accompanying drawing, in which:

Fig. 1 is a longitudinal sectional view of a four-speed change speed gear according to the invention, and Fig. 2 is a corresponding sectional view of a four-speed change speed gear provided with a brake.

Referring now to Fig. 1, four discs 2 are secured rotationally fast on the shaft 1 by means of keys 3. The discs 2 are separated from each other by distance sleeves 4, and clamped between a shoulder 5 of the shaft 1 and a nut 6 by means of said distance sleeves, so that the discs are fixedly located also in axial direction. Discs 7 provided or formed integral with external ring gears are arranged between the discs 2, the discs 7 having a small amount of play in axial direction and being freely rotatable on the sleeves 4. The fixed disc 2 shown farthest to the left in Fig. 1 is provided with annular friction surface at 8, which is situated opposite the ring gear portion of the adjacent movable disc 7. In a similar manner, the other fixed discs 2 are provided with friction surfaces for the adjacent rotatable discs 7. On the side opposite the friction surfaces 8 the movable discs 7 are provided with recesses 9, into which engage the discs 2. In this manner, each movable disc 7 together with the adjacent fixed discs 2 on its right side, forms a system consisting of a cylinder and a piston, the cylinder cavities 10 consisting of narrow annular spaces. For obtaining effective sealing and for increasing frictions, the fixed discs 2 are provided with ring inserts 11 made of extensible or elastic material. Each of the cylinder cavities 10 is accessible through an opening 12 in the distance sleeves 4 and through grooves 13 formed in the shaft 1. The grooves 13 of the shaft communicate with passages 14 leading to annular grooves 15 formed in the free end of the shaft 1. Slidably arranged on the free end of the shaft is a sleeve 16 to which is connected a pressure fluid conduit 17, and which controls the selective connection of the pressure fluid conduit 17 with the passages 13. In this way the cylinder cavities may selectively be filled with pressure fluid.

When pressure fluid is introduced into one of the cylinders 10, the associated movable disc 7 is displaced towards the left and is urged against the adjacent fixed disc 2, so that the movable disc must participate in the movements of the shaft 1, or transmits its own rotational movement to the shaft 1.

The arrangement according to Fig. 2 substantially corresponds to that shown in Fig. 1. As different from Fig. 1, the discs 2a are individually fixed on the shaft 1 by means of set screws 18, while the movable discs 7a run directly on the shaft 1. The discs 7a provided or formed integral with external ring gears are in mesh with gears 19 which are secured rotationally fast on the shaft 20 extending parallel to the shaft 1. Outwardly of the fixed disc 2a situated farthest to the left, there is arranged an axially slidable disc 21 into which engages a driving dog 22, and which faces a stationary surface 23. When pressure is exerted on disc 21 it will enter into engagement with surface 23 whereby it is being braked, this braking being effective on the entire gearing arrangement.

I claim:
1. A power transmission comprising a rotatable shaft, a series of power transmitting members mounted in fixed position on said shaft at spaced intervals along said shaft, a second series of power transmitting members rotatably mounted on said shaft between said fixed members and axially movable relative to said shaft, each said fixed member cooperating with an adjacent movable member to provide a pressure system wherein said movable member constitutes the cylinder and the fixed member constitutes the piston, said shaft being provided with fluid passageways communicating with each said pressure system for applying fluid to each pressure system, each said movable member cooperating with the other adjacent fixed member to frictionally engage said fixed member when fluid is supplied to its respective pressure system.

2. The combination set forth in claim 1 wherein an insert of elastic material is provided between the pressure system formed by each said pair of movable and fixed members to form a fluid seal.

3. The combination set forth in claim 1 wherein said fixed members are maintained in axially spaced relationship by sleeves bearing on said shaft, and said movable members are rotatably mounted on said sleeves.

4. The combination set forth in claim 1 including a stationary surface positioned adjacent one of said movable members and cooperating therewith to provide a brake.

5. A power transmission comprising a rotatable shaft, a pair of power transmitting members mounted in fixed position on said shaft and in spaced relationship, a movable power transmitting member rotatably mounted on said shaft between said fixed members and axially movable relative to said shaft, another power transmitting member mounted adjacent said movable power transmitting member for rotation about an axis parallel to the axis of said shaft, means forming a driving connection between said other power transmitting member and said movable power transmitting member, said driving connection being unaffected by the axial movement of said movable power transmitting member, one of said fixed members cooperating with the movable member to provide a pressure system wherein said movable member constitutes the cylinder and said fixed member constitutes the piston, said shaft being provided with a fluid passageway communicating with said pressure system for applying fluid to said pressure system, said movable member cooperating with the other fixed member to frictionally engage said fixed member when fluid is supplied to the pressure system.

6. A power transmission comprising a rotatable shaft, a pair of power transmitting members mounted in fixed position on said shaft and in spaced relationship, a movable power transmitting member rotatably mounted on said shaft between said fixed members and axially movable relative to said shaft, another power transmitting member mounted adjacent said movable power transmitting member for rotation about an axis parallel to the axis of said shaft, means forming a driving connection between said other power transmitting member and said movable power transmitting member, said driving connection being unaffected by the axial movement of said movable power transmitting member, one of said fixed members cooperating with the movable member to provide a pressure system wherein said movable member constitutes the cylinder and said fixed member constitutes the piston, said shaft being provided with a fluid passageway communicating with said pressure system for applying fluid to said pressure system, said movable member and said other fixed member having annular peripheral surfaces thereof adapted to frictionally engage each other when the fluid is supplied to the pressure system.

References Cited in the file of this patent
UNITED STATES PATENTS 2,600,043     Armitage et al.          June 10, 1952

FOREIGN PATENTS 143,185     Switzerland            Jan. 2, 1931